United States Patent
Tsujimura et al.

(10) Patent No.: US 9,748,601 B2
(45) Date of Patent: Aug. 29, 2017

(54) METHOD OF MANUFACTURING LITHIUM ION CONDUCTIVE SOLID ELECTROLYTE AND LITHIUM-ION SECONDARY BATTERY

(71) Applicant: ASAHI GLASS COMPANY, LIMITED, Chiyoda-ku (JP)

(72) Inventors: Tomoyuki Tsujimura, Tokyo (JP); Akio Koike, Tokyo (JP); Syusaku Akiba, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 197 days.

(21) Appl. No.: 14/189,094

(22) Filed: Feb. 25, 2014

(65) Prior Publication Data
US 2014/0170505 A1  Jun. 19, 2014

Related U.S. Application Data

(63) Continuation of application No. PCT/JP2012/070255, filed on Aug. 8, 2012.

(30) Foreign Application Priority Data

Aug. 31, 2011 (JP) .................. 2011-190023
Jan. 26, 2012 (JP) .................. 2012-014510

(51) Int. Cl.
*H01M 10/0562* (2010.01)
*H01M 10/052* (2010.01)
(Continued)

(52) U.S. Cl.
CPC ......... *H01M 10/0562* (2013.01); *C03C 3/062* (2013.01); *C03C 3/112* (2013.01);
(Continued)

(58) Field of Classification Search
CPC .......... H01M 10/0562; H01M 10/052; H01M 2300/0065; H01M 2300/0068;
(Continued)

(56) References Cited

U.S. PATENT DOCUMENTS

| | | |
|---|---|---|
| 2007/0048617 A1 | 3/2007 | Inda |
| 2008/0142373 A1 | 6/2008 | Joshi et al. |
| 2010/0112457 A1 | 5/2010 | Niessen et al. |

FOREIGN PATENT DOCUMENTS

| | | |
|---|---|---|
| JP | 5-109428 A | 4/1993 |
| JP | 07-094014 | 4/1995 |

(Continued)

OTHER PUBLICATIONS

Supplementary Search Report issued Oct. 15, 2015 in European Patent Application No. EP 12 82 8281.
(Continued)

*Primary Examiner* — Ula C Ruddock
*Assistant Examiner* — Thomas Parsons
(74) *Attorney, Agent, or Firm* — Oblon, McClelland, Maier & Neustadt, L.L.P.

(57) ABSTRACT

A method of manufacturing a lithium ion conductive solid electrolyte includes (a) a step of preparing an object to be processed including a crystalline material, that includes alkali metal other than lithium and whose ionic conductivity at room temperature is greater than or equal to $1 \times 10^{-13}$ S/cm; and (b) a step of performing an ion-exchange process on the object to be processed in molten salt including lithium ions.

7 Claims, 5 Drawing Sheets (51) Int. Cl.

| | |
|---|---|
| *C03C 3/062* | (2006.01) |
| *C03C 3/112* | (2006.01) |
| *C03C 10/00* | (2006.01) |
| *C03C 10/16* | (2006.01) |
| *C03C 21/00* | (2006.01) |

(52) U.S. Cl.
CPC .......... *C03C 10/00* (2013.01); *C03C 10/0027* (2013.01); *C03C 10/0045* (2013.01); *C03C 10/16* (2013.01); *C03C 21/002* (2013.01); *H01M 10/052* (2013.01)

(58) Field of Classification Search
CPC .......... H01M 2300/0074; C03C 3/062; C03C 3/112; C03C 10/0009; C03C 10/00; C03C 10/0027; C03C 10/0045; C03C 21/002; C03C 21/008
See application file for complete search history.

(56) References Cited

FOREIGN PATENT DOCUMENTS

| JP | 2003-12372 A | 1/2003 |
|---|---|---|
| JP | 2003-086179 | 3/2003 |
| JP | 2006-503416 A | 1/2006 |
| JP | 2007-66703 | 3/2007 |
| JP | 2010-513710 | 4/2010 |
| JP | 2010-524164 | 7/2010 |
| JP | 2010-275130 | 12/2010 |
| JP | 2010275130 | * 12/2010 |
| JP | 2011-079707 | 4/2011 |
| JP | 2011079707 | * 4/2011 |
| WO | WO 2004/036669 A2 | 4/2004 |

OTHER PUBLICATIONS

Shigeki Morimoto, "Ionic Conductivity of $Na_2O$—$ZrO_2$—$P_2O_5$ $SiO_2$ System Glass Ceramic", Journal of the Ceramic Society of Japan, vol. 97, [10], Jan. 1, 1989, XP055217717, pp. 1097-1103.

Tomoyuki Tsujimura, "Li-ion conductive phosphosilicate glass ceramics synthesized by ion exchange", Solid State Ionics, vol. 262, 2014, XP028855848, pp. 829-832.

Tomoyuki Tsujimura, "Li-ion Conductive Phosphate Glass Synthesized by Using Ion Exchange", ECS Transactions, The Electrochemical Society, vol. 45, No. 1, 2012, XP055217630, pp. 135-141.

International Search Report issued Oct. 9, 2012 in PCT/JP2012/070255 filed Aug. 8, 2012.

Nagai Masayuki , "Course of study for practical refractor, "Basic science for refractor: crystal chemistry and physical properties of components", Alumina ($Al_2O_3$) No. 1, (β alumina)", Musashi Inst. of Technology, Refractor 45(3):164-171 (1993).

J. P. Boilot, et al., "Sodium and lithium superionic gels and glasses", Journals of Materials Science Letters, vol. 4, 1985, pp. 22-24 and Cover Page.

Xiaoxiong Xu, et al., "Preparation and electrical properties of NASICON-type structured $Li_{1-4}Al_{0-4}Ti_{1.6}(PO_4)_3$ glass-ceramics by the citric acid-assisted sol-gel method", Solid State Ionics, vol. 178, 2007, pp. 29-34.

* cited by examiner

METHOD OF MANUFACTURING LITHIUM ION CONDUCTIVE SOLID ELECTROLYTE AND LITHIUM-ION SECONDARY BATTERY

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2012/070255 filed on Aug. 8, 2012, which is based upon and claims the benefit of priority of Japanese Priority Application No. 2011-190023 filed on Aug. 31, 2011, and Japanese Priority Application No. 2012-014510 filed on Jan. 26, 2012, the entire contents of which are hereby incorporated by reference.

BACKGROUND OF THE INVENTION

1. Field of the Invention

The present invention relates to a method of manufacturing a lithium ion conductive solid electrolyte that is used for a lithium-ion secondary battery or the like and a lithium-ion secondary battery including such a lithium ion conductive solid electrolyte.

2. Description of the Related Art

Lithium-ion secondary batteries are used as small size drive power supplies with a high capacity for various fields such as automobiles, personal computers, mobile phones or the like.

Currently, as an electrolyte of the lithium-ion secondary battery, a liquid electrolyte of organic solvent such as ethylene carbonate, diethyl carbonate and methylethyl carbonate is used. However, generally, as such a liquid electrolyte of organic solvent is flammable, there may be problem of safety in a current lithium-ion secondary battery. Further, the liquid electrolyte of organic solvent has a limit in withstand voltage and if a high voltage is applied, there may be a case that the electrolyte is decomposed or altered.

With such a background, applying of inorganic solid electrolytes that are nonflammable and have a high stability against applied voltage is expected as electrolytes for lithium-ion secondary batteries of a next generation.

However, generally, such an inorganic solid electrolyte has a tendency that lithium ion conductivity is not so good compared with a liquid electrolyte at room temperature. Thus, in the present circumstances, lithium-ion secondary batteries using the inorganic solid electrolyte are used only for some products such as a thin small-size battery mounted on a pacemaker or the like.

Here, in order to cope with such a problem of the inorganic solid electrolyte, a method is proposed in which glass including monovalent ions whose ionic radii are larger than those of lithium ions is performed with an ion-exchange process in lithium ions contained in molten salt so that the monovalent ions are substituted for by the lithium ions by the ion-exchange process (Patent Document 1).

Patent Document

[Patent Document 1] Japanese Laid-open Patent Publication No. 2010-275130

It is described in Patent Document 1 that a glass electrolyte with improved lithium ion conductivity compared with that before the ion-exchange process can be obtained by the above described method.

However, when considering about applying to actual lithium-ion secondary batteries, the improved effect of the lithium ion conductivity by the method of Patent Document 1 is not enough. Thus, even today, a method of manufacturing a solid electrolyte capable of further increasing lithium ion conductivity is required.

SUMMARY OF THE INVENTION

The present invention is made in light of the above background, and an object is to provide a method of manufacturing a lithium ion conductive solid electrolyte by which a further greater ion conductivity improving effect can be obtained compared with the conventional method in which glass is performed with an ion-exchange process. Further, in this embodiment, an object is to provide a lithium-ion secondary battery including such a lithium ion conductive solid electrolyte.

According to an embodiment, there is provided a method of manufacturing a lithium ion conductive solid electrolyte including, (a) a step of preparing an object to be processed including a crystalline material, that includes alkali metal other than lithium and whose ionic conductivity at room temperature is greater than or equal to $1\times10^{-13}$ S/cm, and (b) a step of performing an ion-exchange process on the object to be processed in molten salt including lithium ions.

Further, according to an embodiment, there is provided a lithium-ion secondary battery including:

an anode electrode;

a cathode electrode; and an electrolyte provided between the anode electrode and the cathode electrode, wherein the electrolyte includes the lithium ion conductive solid electrolyte manufactured by the above described method.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

A structure of the invention will be described herein with reference to illustrative embodiments.

Figure 1:
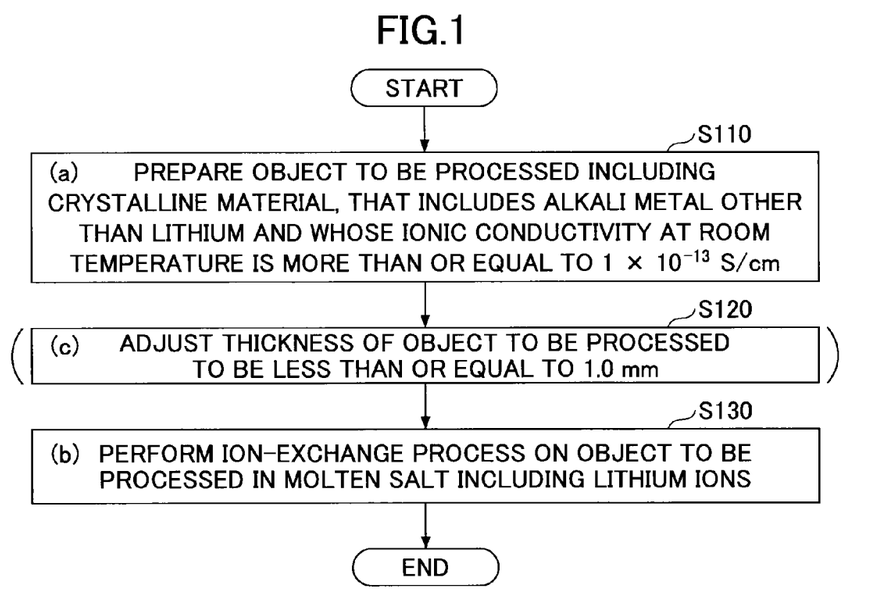
FIG. 1 is a flowchart illustrating an example of a method of manufacturing a lithium ion conductive solid electrolyte of an embodiment.

FIG. 1 is a flowchart schematically illustrating an example of a method of manufacturing a lithium ion conductive solid electrolyte of the embodiment.

As illustrated in FIG. 1, the method of manufacturing a lithium ion conductive solid electrolyte of the embodiment includes (a) a step of preparing an object to be processed including a crystalline material, that includes alkali metal other than lithium and whose ionic conductivity at room temperature (20° C. to 25° C., the same hereinafter) is more than or equal to $1 \times 10^{-13}$ S/cm (Step S110), and (b) a step of performing an ion-exchange process on the object to be processed in molten salt including lithium ions (Step S130).

Further, the method of manufacturing in the embodiment may optionally include (c) a step of adjusting the thickness of the object to be processed to be less than or equal to 1.0 mm (Step S120) between step S110 and step S130.

In this embodiment, the ionic conductivity of the object to be processed at room temperature is greater than or equal to $1 \times 10^{-13}$ S/cm, preferably, the ionic conductivity of the object to be processed is more than or equal to $1 \times 10^{-12}$ S/cm, more preferably, more than or equal to $1 \times 10^{-11}$ S/cm, furthermore preferably, more than or equal to $1 \times 10^{-10}$ S/cm, and yet furthermore preferably, more than or equal to $1 \times 10^{-9}$ S/cm.

Further, in this embodiment, the crystalline material preferably includes at least one crystal structure selected from a group consisting of mica type, NASICON type, βiron (III) sulfate type, Perovskite type, CaS(NaCl) type, β" alumina substituted type, montmorillonite substituted type, hollandite type and zircon type. (Any of these crystal structures have the ionic conductivity more than or equal to $1 \times 10^{-13}$ S/cm.) Thus, in the following description, features of the present invention are explained under an assumption that the object to be processed includes the above described crystalline material.

Here, the "crystal structure" according to the embodiment is identified by measuring an X-ray diffraction of an object, obtaining lattice spacing from the X-ray crystal diffraction data, and matching based on a Joint Committee on Powder Diffraction Standards (JCPDS) card.

In the method of manufacturing a lithium ion conductive solid electrolyte of the embodiment, first, an object to be processed including a crystalline material, that includes alkali metal other than lithium and has at least a crystal structure selected from a group consisting of mica type, NASICON type, β iron sulfate type, Perovskite type, CaS (NaCl) type, β alumina substituted type, montmorillonite substituted type, hollandite type and zircon type is prepared, in step S110.

Any of the crystalline materials having such a crystalline structure, provided that they include alkali metal, have characteristics that the alkali metal ion conductivity is relatively high. Thus, by using the crystalline material having such a crystalline structure as a starting material, in other words, an object to be processed, a solid electrolyte with high lithium ion conductivity can be finally obtained.

Here, in this embodiment, the object to be processed may be structured only by the crystalline material having such a crystalline structure, or alternatively, the object to be processed may be provided as a mixture of a glass material (amorphous material) and a crystalline material. For example, the object to be processed may be structured by glass ceramics in which such a crystalline material is dispersed in a matrix of a glass phase (amorphous phase). The object to be processed is preferably glass ceramics. When the glass ceramics is used as the object to be processed, interface resistance can be suppressed to be lower and formability can be improved.

Then, in this embodiment, the object to be processed including the crystalline material having the crystal structure as described above is performed with an ion-exchange process in molten salt including lithium ions (Step S130). With this, at least a part of alkali metal ions except lithium ions (referred to as an "other alkali metal ions", hereinafter) in the crystalline material is substituted for by lithium ions. Ion exchanged lithium ions are introduced into sites that are originally occupied by the "other alkali metal ions" such as sodium ions and/or potassium ions or the like.

Here, the lithium ions have smaller ionic radii compared with other alkali metal ions. Thus the lithium ions introduced into the sites that are originally occupied by the other alkali metal ions have great flexibility in movement. Therefore, by the ion-exchange process, a large ionic conductivity is provided to the crystalline material. For example, in this embodiment, the ionic conductivity of the object to be processed can be increased about more than or equal to one digit (in other words, one order of magnitude), preferably, more than or equal to two digits before and after the ion-exchange process. The ionic conductivity of the lithium ion conductive solid electrolyte at room temperature is preferably more than or equal to $1 \times 10^{-8}$ S/cm, more preferably, more than or equal to $1 \times 10^{-7}$ S/cm, furthermore preferably, more than or equal to $1 \times 10^{-6}$ S/cm, and yet furthermore preferably, more than or equal to $1 \times 10^{-5}$ S/cm.

Here, step S120 is performed in order to furthermore effectively perform the ion-exchange process in step S130. This means that the other alkali metal ions included in the crystalline material can be furthermore rapidly and effectively ion-exchanged by lithium ions by reducing the thickness of the object to be processed.

As such, in this embodiment, two steps of ionic conductivity improving effects are used including originally preparing a crystalline material having a high ionic conductivity of alkali metal ions, and then performing an ion-exchange process with lithium ions. With these features, in this embodiment, a lithium ion conductive solid electrolyte in which an ionic conductivity is further improved compared with conventional ones can be provided.

Each step is explained in detail in the following.
(Step S110)

First, a crystalline material is prepared that includes alkali metal other than lithium and has at least one crystal structure (hereinafter, referred to as a "crystal structure A") selected from a group consisting of mica type, NASICON type, β iron (III) sulfate type, Perovskite type, CaS(NaCl) type, β" alumina substituted type, montmorillonite substituted type, hollandite type and zircon type.

For the crystal structure, mica type or NASICON type is preferable, and NASICON type is more preferable. This is because mica type has ion conducting paths in two dimensional directions while NASICON type has ion conducting paths in three dimensional directions.

The alkali metal other than lithium, in other words, the "other alkali metal", is sodium, potassium, rubidium, cesium and/or francium. Here, the crystalline material may further include lithium.

Here, in this embodiment, the object to be processed may be structured only by the crystalline material having the above described crystal structure A, or alternatively, the object to be processed may be provided as a mixture of a glass material and the crystalline material. For the latter case, the crystalline material may be glass ceramics that is dispersed in a glass phase.

An example of a method of preparing the object to be processed of the embodiment is explained in the following. Here, in the following explanation, an object to be processed in which the crystalline material having the crystal structure A is dispersed in amorphous material is exemplified and its preparing method is explained.

In a general case, the method of preparing the object to be processed includes a step of providing an amorphous material including the "other alkali metal" (Step a) and a step of performing a heat treatment on the amorphous material (Step b). Each step is explained in the following.

(Step a)

The amorphous material including the "other alkali metal" is provided via the following processes.

First, a raw material is prepared. The raw material includes "other alkali metal" other than lithium. Here, the raw material may further include lithium.

The raw material is prepared based on the chemical composition of the crystalline material that is to be deposited in the amorphous material in the following step.

For example, when a raw material having a composition illustrated in Table 1 is used and dissolved, a crystalline material $Na_{1.5}Mg_3AlSi_{4.5}O_{13.25}F_2$ that has a mica crystal structure is deposited in amorphous phase.

TABLE 1

| COMPOUND | (mol %) |
|---|---|
| $SiO_2$ | 47.4 |
| $Al_2O_3$ | 5.3 |
| MgO | 28.9 |
| NaF | 15.8 |
| $MgF_2$ | 2.6 |

Further, for example, in order to dispersedly deposit a crystalline material having a NASICON type crystal structure in amorphous phase, a raw material having a composition illustrated in Table 2 is used, for example.

TABLE 2

| COMPOUND | (mol %) |
|---|---|
| $SiO_2$ | 40 |
| $ZrO_2$ | 25 |
| $P_2O_5$ | 15 |
| $Na_2O$ | 20 |

Then, by a general method, a shaped amorphous material is formed by heating the raw material to be dissolved, and solidifying it in a mold, for example. The amorphous material may be in any embodiment. The amorphous material may be, for example, in a plate form, in a powder form, and/or a powder or the like.

The obtained amorphous material may include a crystalline material. In other words, after heating the raw material to be dissolved and while being solidified, at least a part of the amorphous material may be crystallized and a crystalline material may be deposited. Further, in order to remove the distortion in the obtained amorphous material, it is preferable to solidify the raw material by a slow cooling (slow cooling speed of 0.5° C./minute to 5° C./minute, for example).

(Step b)

Then, the amorphous material obtained by the above described method is performed with a heat treatment.

The heat treatment is performed in order to crystallize at least a part of the amorphous material and deposit a crystalline material.

Thus, the condition of the heat treatment may be any condition provided that it suits to crystallize such an amorphous material.

For example, for the amorphous material having the composition illustrated in the above described Table 1, a crystalline material expressed by chemical formula $Na_{1.5}Mg_3AlSi_{4.5}O_{13.25}F_2$ can be deposited by performing a heat treatment of a temperature range of about 700° C. to 800° C. for about 1 hour to 10 hours.

Similarly, for the amorphous material having the composition illustrated in the above described Table 2, a crystalline material having a NASICON type crystal structure can be deposited by performing a heat treatment (first heat treatment) of a temperature range of about 750° C. to 850° C. for about 1 hour to 10 hours, and further performing a heat treatment (second heat treatment) of a temperature range of about 950° C. to 1050° C. for about 30 minutes to 2 hours.

Here, the above described heat treatment condition is just an example and the crystalline material may be deposited by other heat treatment conditions. For example, the crystalline material having a mica crystal structure may be deposited by heat treatments of two steps, and the crystalline material having a NASICON type crystal structure may be deposited by a single heat treatment.

In the above description, it is explained that the method by which the crystalline material having the crystal structure A is formed by preparing the amorphous material first (Step S112), and performing the heat treatment on the amorphous material (Step S114). In other words, in the method, the raw material is heated to be dissolved, solidified, and further performed with the heat treatment to form the crystalline material.

For a method other than the above method, the crystalline material may be formed by sintering, without dissolving the raw material. However, rather than the sintering method without dissolving the raw material, it is more preferable to form the crystalline material by heating the raw material to be dissolved, solidifying, and performing the heat treatment. This is because, the crystalline material with a low void content and a low grain boundary resistance can be readily obtained by the latter method. This means that according to the latter method, the solid electrolyte having a high ionic conductivity and being easy to be fabricated can be readily obtained. In particular, it is preferable that the crystalline material is partially deposited in the amorphous material after the raw material is heated to be dissolved and while being solidified. In such a case, the crystalline material with a low void content and with a low grain boundary resistance can be more readily obtained, and further, the solid electrolyte having a high ionic conductivity and being easy to be fabricated can be more readily obtained.

With the above steps, an object to be processed including the crystalline material having the "crystal structure A" is prepared. The shape of the object to be processed may be in a block form, a plate form, a disk form or the like, for example.

(Step S120)

Then, if necessary, the object to be processed prepared in step S110 is further processed (grinded, for example) so that the thickness of the object to be processed becomes less than or equal to 1.0 mm.

With this, the process period for the ion-exchange process can be shortened and/or the process temperature for the ion-exchange process can be lowered in the following step S130.

Here, by previously preparing the object to be processed with a thin thickness in the above described step S110, this step may be omitted.

It is preferable that a lower limit of the thickness of the processed object to be processed is, 0.1 mm, for example. If the thickness is less than 0.1 mm, handling may be complicated. Further, if the thickness exceeds 1.0 mm, time necessary for exchanging the other alkali metal ions with lithium ions in the following ion-exchange process of the object to be processed may be longer.

(Step S130)

Then, an ion-exchange process is performed on the object to be processed.

The process condition of the ion-exchange process is not specifically limited as long as lithium ions can be introduced at a part of the sites occupied by the other alkali metal ions in the object to be processed.

For example, not specifically limited though, the ion-exchange process may be performed by immersing the object to be processed in molten salt including lithium for a predetermined period.

For the molten salt including lithium, lithium nitrate, lithium nitrite, lithium sulfate, lithium chloride, lithium fluoride, mixed salt of these, or the like may be used, for example.

Although the temperature of the ion-exchange process varies depending of the used molten salt, for example, the temperature of the ion-exchange process is 200° C. to 400° C. Further, although the process period varies depending on temperature, for example, the process period may be a range of 24 hours to 120 hours. By such a process period, more than or equal to 90% of the other alkali metal ions can be substituted for by lithium ions.

As described above, lithium ions whose ionic radii are small are introduced into the site of the crystalline material that is occupied by the other alkali metal ions whose ionic radii are large, by the ion-exchange process. With this, the ionic conductivity of lithium ions of the crystalline material is improved.

Further, when the mixed material of amorphous phase including the other alkali metal ions and the crystalline material is used as the object to be processed, the other alkali metal ions in the amorphous phase are also substituted for by lithium ions by the ion-exchange process. With this, the ionic conductivity of lithium ions in the amorphous phase is also improved.

Thus, in both cases, the object to be processed having a higher lithium ion conductivity can be obtained by the ion-exchange process.

(Lithium-Ion Secondary Battery)

The lithium ion conductive solid electrolyte manufactured by the manufacturing method of the embodiment may be used for a lithium-ion secondary battery, for example.

Figure 2:
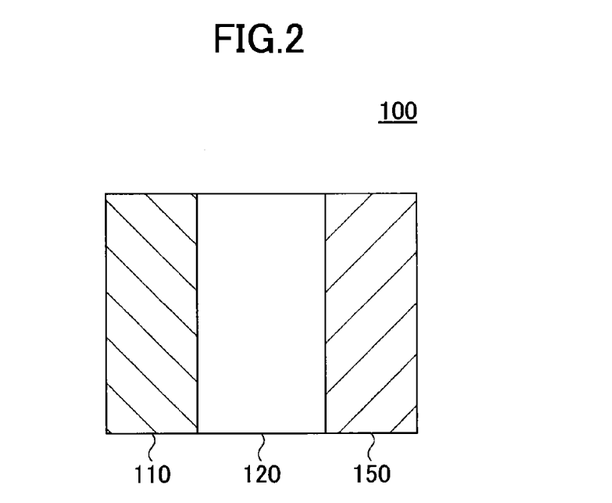
FIG. 2 is a schematic view illustrating an example of a lithium-ion secondary battery of the embodiment.

FIG. 2 schematically illustrates an example of a structure of such a lithium-ion secondary battery.

As illustrated in FIG. 2, a lithium-ion secondary battery 100 includes a cathode electrode 110, an anode electrode 150 and an electrolyte 120 provided between the electrodes.

For the cathode electrode 110, for example, $LiCoO_2$, $LiMn_2O_4$, $LiFePO_4$ or the like is used. For the anode electrode 150, for example, metal lithium, graphite, $Li_4Ti_5O_{12}$ or the like is used. These are just examples and those skilled in the art will recognize that other electrode materials may be used for the electrodes.

Here, for the electrolyte 120, the lithium ion conductive solid electrolyte manufactured by the above described manufacturing method of the embodiment is used.

When such a solid electrolyte is used as the electrolyte 120, a high stability can be provided to a lithium-ion secondary battery compared with a case when the conventional liquid electrolyte of organic solvent is used. Further, such a ceramics type solid electrolyte has a high stability against applied voltage compared with the conventional liquid electrolyte of organic solvent. Thus, the conventional problem that the electrolyte is decomposed or altered when a high voltage is applied to the lithium-ion secondary battery can be significantly reduced.

Further, as described above, the lithium ion conductive solid electrolyte manufactured by the manufacturing method of the embodiment has significantly high lithium ion conductivity. Thus, the lithium-ion secondary battery 100 including the electrolyte 120 that is structured by such lithium ion conductive solid electrolyte can show better characteristics than a secondary battery including a conventional glass solid electrolyte.

EXAMPLES

Examples are explained in the following.

Example 1

(Manufacturing of Evaluation Sample)

An evaluation sample was manufactured by the following method and its characteristics were evaluated.

The evaluation sample was manufactured as follows.

First, raw material powders in accordance with the chemical composition illustrated in Table 1 were measured and mixed. Then, the mixed raw material was put into a platinum crucible and heated at 1450° C. for 30 minutes to dissolve the mixed raw material. Then, the dissolved raw material was flowed on a carbon substrate. Then, in order to remove the distortion in the glass, the dissolved raw material flowed on the carbon substrate was heated at 750° C. for 1 hour and cooled to be room temperature during 12 hours to manufacture a block amorphous sample.

Then, the amorphous sample was retained at 750° C. for 3 hours in atmosphere, and then cooled to room temperature to obtain a heat treated sample.

Figure 3:
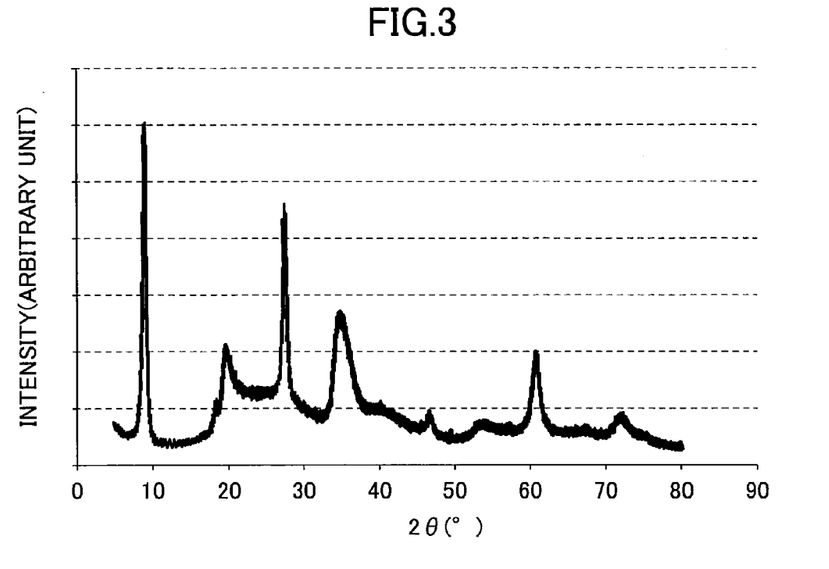
FIG. 3 is a view illustrating an X-ray diffraction result of a heat treated sample in example 1.

FIG. 3 illustrates an X-ray diffraction result of the heat treated sample.

As several diffraction peaks are clearly recognized in FIG. 3, it can be understood that the heat treated sample includes a crystalline material. As a result of peak analysis, it was confirmed that the crystal structure of the crystalline material was a mica type. It is estimated that the crystalline material is probably $Na_{1.5}Mg_3AlSi_{4.5}O_{13.25}F_2$ based on the raw material composition.

As such, it was revealed that the heat treated sample in which the mica type crystalline material is deposited is obtained by performing the heat treatment on the amorphous sample.

Then, the heat treated sample block was grinded to have a thickness of 0.6 mm.

Then, an ion-exchange process was performed on the grinded heat treated sample. The ion-exchange process was performed such that the heat treated sample was immersed in lithium nitrate molten salt at 400° C. The process period was 72 hours.

With this, an evaluation sample (referred to as a "sample in example 1") was obtained.

Figure 4:
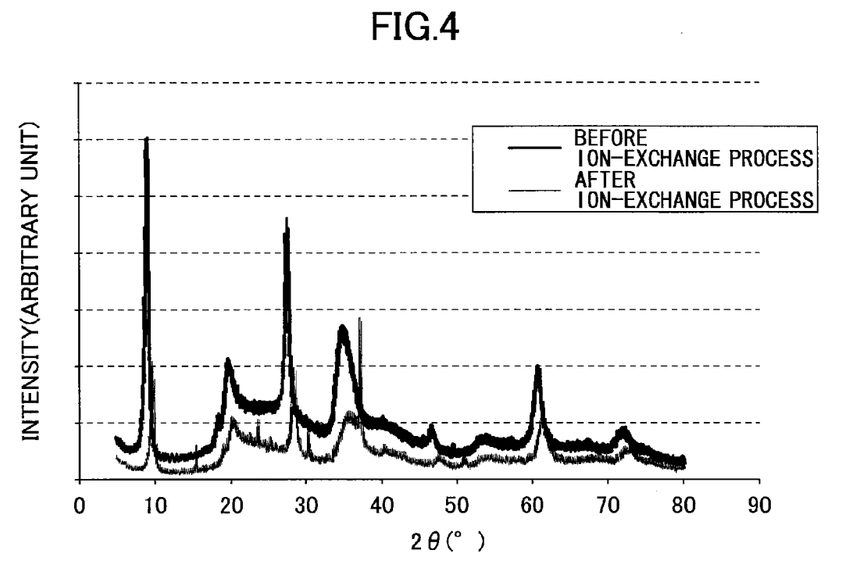
FIG. 4 is a view illustrating an X-ray diffraction result of a sample in example 1 after the ion-exchange process (bold line) with that before the ion-exchange process (fine line)

FIG. 4 illustrates an X-ray diffraction result of the sample in example 1 after the ion-exchange process. Here, the X-ray diffraction result of the heat treated sample illustrated in FIG. 3 is also illustrated in FIG. 4.

As illustrated in FIG. 4, as the X-ray diffraction results before and after the ion-exchange process are almost the same, it can be understood that the sample in example 1 has a crystal structure similar to that of the sample before the ion-exchange process, in other words, the crystal structure of mica type.

Here, in FIG. 4, it is confirmed that the peak position is slightly shifted between the sample before the ion-exchange process and the sample after the ion-exchange process. This can be considered that because, due to the substitution and introduction of lithium ions to the sites originally occupied by sodium ions, the interlayer distance in the mica type structure is varied, the distortion is generated in the crystal structure and the grating constant is varied.

When the actual lithium amount contained in the sample in example 1 was analyzed by the ICP analysis method, the contained lithium amount was 4.44 mass %, based on the content of $Li_2O$ (contained sodium amount was 0.08 mass %, based on the content of $Na_2O$). When assuming that sodium in the sample in example 1 before the ion-exchange process is substituted for by lithium by the ion-exchange process for 100%, theoretically, the contained lithium amount becomes 4.59 mass %, based on the content of $Li_2O$. The analysis result of this example is extremely close to the theoretical value, and it was confirmed that almost all of sodium ions in the sample were substituted for by lithium ions by the ion-exchange process.

(Characteristics Evaluation)

An ionic conductivity was measured using the obtained sample in example 1 by the following method.

First, gold films (the thickness of which was about 1 μm) were formed at both surfaces of the sample in example 1 by an evaporation method.

By using these gold films as electrodes, impedance was measured by applying a measurement voltage of 1 V between the electrodes. For the measurement, Solartron 1260 (manufactured by Solartron) including a Frequency Response Analyzer (FRA) was used in which a measurement frequency was $10^7$ Hz to $10^2$ Hz. Then, the ionic conductivity of the sample in example 1 was calculated from an arc diameter obtained by a Cole-Cole plot.

As a result of the measurement, the ionic conductivity at room temperature was $2.0 \times 10^{-7}$ S/cm. The ionic conductivity of the sample before the ion-exchange process (heat treated sample) at room temperature was $4.6 \times 10^{-9}$ S/cm. Thus, it was revealed that the ionic conductivity of the sample increases more than or equal to one digit by the ion-exchange process.

In the following Table 3, the mixed raw material composition when manufacturing the sample in example 1, the heat treatment condition for depositing the crystalline material, the ion-exchange process condition and the ionic conductivity of the sample in example 1 measured after the ion-exchange process are illustrated together.

TABLE 3

|  |  | EXAMPLE 1 | RELATIVE EXAMPLE 1 | RELATIVE EXAMPLE 2 |
|---|---|---|---|---|
| MIXED RAW MATERIAL COMPOSITION (mol %) | $SiO_2$ | 47.4 | 47.4 | 47.4 |
|  | $Al_2O_3$ | 5.3 | 5.3 | 5.3 |
|  | MgO | 28.9 | 28.9 | 28.9 |
|  | NaF | 15.8 | 15.8 | — |
|  | $MgF_2$ | 2.6 | 2.6 | 2.6 |
|  | LiF | — | — | 15.8 |
| HEAT TREATMENT |  | 750° C. × 3 HOURS | NO | 750° C. × 3 HOURS |
| ION-EXCHANGE PROCESS |  | 400° C. × 72 HOURS | 400° C. × 72 HOURS | NO |
| IONIC CONDUCTIVITY (S/cm) |  | $2.0 \times 10^{-7}$ | $1.8 \times 10^{-10}$ | $1.0 \times 10^{-11}$ |

Relative Example 1

By a method similar to that of example 1, a sample in relative example was manufactured and its characteristics were evaluated.

However, the heat treatment for depositing the crystalline material was not performed in relative example 1. This means that the amorphous sample was used as it was and the ion-exchange process was performed. Other manufacturing conditions, evaluating conditions and the like were the same as those of example 1.

As a result of the impedance measurement, at room temperature, the ionic conductivity of the sample before the ion-exchange process was $1.8 \times 10^{-11}$ S/cm while the ionic conductivity of the sample after the ion-exchange process was $1.8 \times 10^{-10}$ S/cm in relative example 1.

In the above described Table 3, the mixed raw material composition when manufacturing the sample in relative example 1, the ion-exchange process condition and the ionic conductivity of the relative example 1 measured after the ion-exchange process are illustrated together.

Relative Example 2

By a method similar to that of example 1, a sample in relative example 2 was manufactured and its characteristics were evaluated.

However, in relative example 2, instead of NaF, LiF of the same molar ratio was used as the alkali metal salt raw material. Further, in relative example 2, the ion-exchange process was not performed. This means that the heat treated sample was used as it was and the impedance was measured. Other manufacturing conditions and evaluating conditions were the same as those of example 1. It is assumed that a crystalline material $Li_{1.5}Mg_3AlSi_{4.5}O_{13.25}F_2$ is deposited in relative example 2 by the heat treatment.

As a result of the impedance measurement, at room temperature, the ionic conductivity was $1.0 \times 10^{-11}$ S/cm.

In the above described Table 3, the mixed raw material composition when manufacturing the sample in relative example 2, the heat treatment condition for depositing the crystalline material and the measured ionic conductivity of the sample in relative example 2 are illustrated together.

It can be understood from the evaluated results of the ionic conductivity in example 1 and relative example 1 that a good ionic conductivity cannot be obtained just by performing the ion-exchange process on the sample in the amorphous state as relative example 1 (the ionic conductivity at room temperature was $1.8 \times 10^{-10}$ S/cm). Further, it can be understood from the evaluated results of the ionic conductivity in example 1 and relative example 2 that a good ionic conductivity cannot be obtained just by depositing a crystalline material including lithium ions without performing the ion-exchange process as relative example 2 (the ionic conductivity at room temperature was $1.0 \times 10^{-11}$ S/cm). On the other hand, a high ionic conductivity could be obtained for the sample in example 1 (the ionic conductivity at room temperature was $2.0 \times 10^{-7}$ S/cm). For example, it was revealed that the ionic conductivity of the sample in example 1 is increased about three digits compared with that of the sample in relative example 1 and about four digits compared with that of the sample in relative example 2.

As such, it was confirmed that the ionic conductivity of the sample in example 1 manufactured by the method of the embodiment is significantly improved.

Example 2

An evaluation sample (sample in example 2) was manufactured by the following method and its characteristics were evaluated.

The evaluation sample was manufactured as follows.

First, raw material powders in accordance with the chemical composition illustrated in Table 2 were measured and mixed. Then, the mixed raw material was put into a platinum crucible and heated at 1600° C. for 30 minutes to dissolve the mixed raw material. Then, the dissolved raw material was flowed on a carbon substrate. Then, in order to remove the distortion in the glass, the dissolved raw material flowed on the carbon substrate was heated at 830° C. for 1 hour and cooled to be room temperature during 12 hours to manufacture a block amorphous sample.

Then, the amorphous sample was retained at 800° C., for 2 hours in atmosphere, retained at 1000° C. for 1 hour and cooled to room temperature to obtain a heat treated sample.

It was confirmed that the heat treated sample includes a crystalline material by an X-ray diffraction result of the heat treated sample. Further, as a result of peak analysis, it was confirmed that the crystal structure of the crystalline material was NASICON type.

As such, it was confirmed that the heat treated sample in which a NASICON type crystalline material is deposited is obtained by performing a heat treatment on the amorphous sample.

Then, the heat treated sample block was grinded to be a thickness of 0.6 mm.

Then, an ion-exchange process was performed on the grinded heat treated sample. The ion-exchange process was performed by immersing the heat treated sample in lithium nitrate molten salt at 400° C. The process period was 72 hours.

With this, a "sample in example 2" was obtained.

Figure 5:
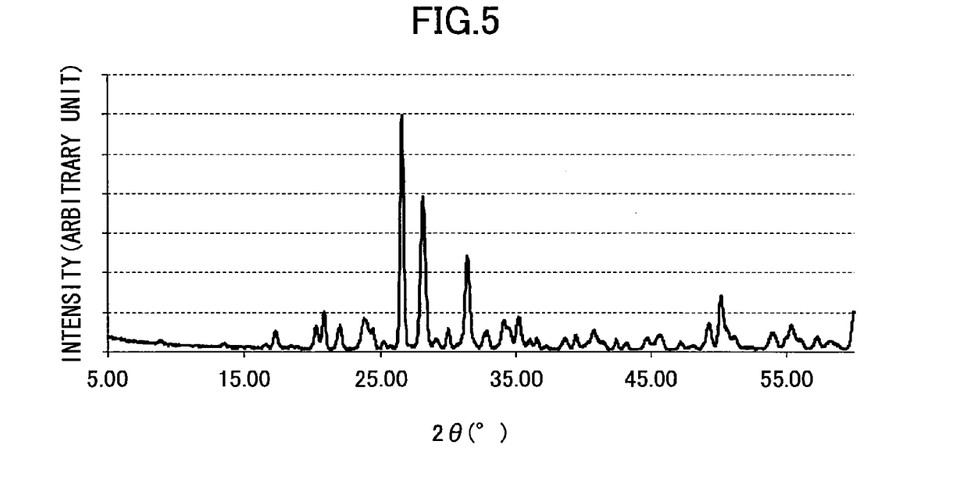
FIG. 5 is a view illustrating an X-ray diffraction result of a sample in example 2 after the ion-exchange process.

FIG. 5 illustrates an X-ray diffraction result of the sample in example 2 after the ion-exchange process. The X-ray diffraction results of the sample before and after the ion-exchange process were almost the same. With this result, it was confirmed that the sample in example 2 has a crystal structure similar to that of the sample before the ion-exchange process, in other words, the crystal structure of lithium substituted NASICON type.

Here, when the actual lithium amount contained in the sample in example 2 was analyzed by the ICP analysis method, the contained lithium amount was 7.36 mass %, based on the content of $Li_2O$ (contained sodium amount was 0.08 mass %, based on the content of $Na_2O$). When assuming that that sodium in the sample in example 2 before the ion-exchange process is substituted for by lithium by the ion-exchange process for 100%, theoretically, the contained lithium amount becomes 7.47 mass %, based on the content of $Li_2O$. The analysis result of this example is extremely close to the theoretical value, and it was confirmed that almost all of sodium ions in the sample were substituted for by lithium ions by the ion-exchange process.

(Characteristics Evaluation)

An ionic conductivity was measured using the obtained sample in example 2 by the above described method. As a result of evaluation, the ionic conductivity of the sample in example 2 at room temperature was $3.6 \times 10^{-5}$ S/cm. The ionic conductivity of the sample (heat treated sample) before the ion-exchange process at room temperature was $4.1 \times 10^{-7}$ S/cm. Thus, it was revealed that the ionic conductivity of the sample increases more than or equal to one digit by the ion-exchange process.

In Table 4, the mixed raw material composition when manufacturing the sample in example 2, the heat treatment condition for depositing the crystalline material, the ion-exchange process condition and the ionic conductivity of the sample in example 2 measured after the ion-exchange process are illustrated together.

TABLE 4

| | | EXAMPLE 2 | RELATIVE EXAMPLE 3 |
|---|---|---|---|
| MIXED RAW MATERIAL COMPOSITION (mol %) | $SiO_2$ | 40 | 40 |
| | $ZrO_2$ | 25 | 25 |
| | $P_2O_5$ | 15 | 15 |
| | $Na_2O$ | 20 | 20 |
| HEAT TREATMENT | | 800° C. × 2 HOURS + 1000° C. × 1 HOUR | NO |
| ION-EXCHANGE PROCESS | | 400° C. × 72 HOURS | 400° C. × 72 HOURS |
| IONIC CONDUCTIVITY (S/cm) | | $3.6 \times 10^{-5}$ | $6.1 \times 10^{-6}$ |

Relative Example 3

By a method similar to that of example 2, a sample in relative example 3 was manufactured and its characteristics were evaluated.

However, the heat treatment for depositing crystalline material was not performed in relative example 3. This means that the amorphous sample was used as it was and the ion-exchange process was performed. Other manufacturing conditions and evaluating conditions were the same as those of example 2.

Figure 6:
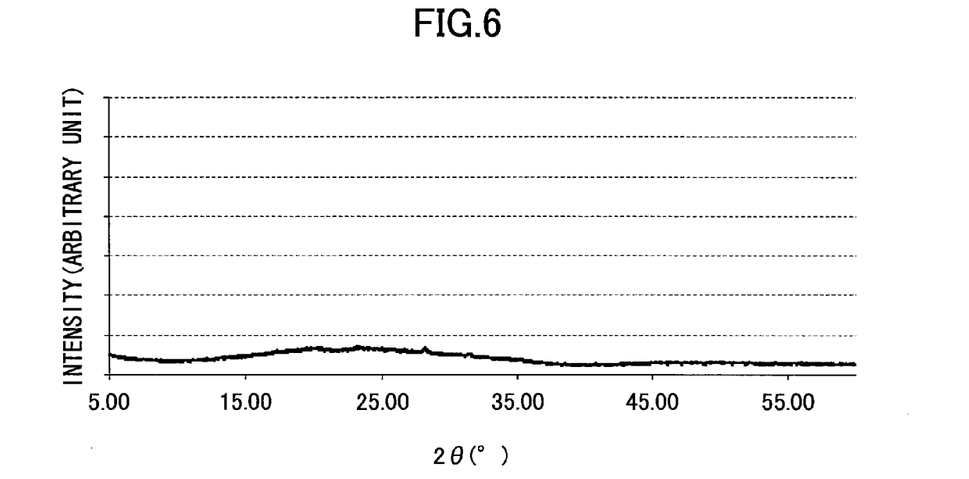
FIG. 6 is a view illustrating an X-ray diffraction result of a sample in relative example 3 after the ion-exchange process.

FIG. 6 illustrates an X-ray diffraction result of the sample in relative example 3 after the ion-exchange process. In FIG. 6, as diffraction peaks are not recognized, it can be understood that the sample in relative example 3 is in the amorphous state even after the ion-exchange process.

As a result of the impedance measurement, at room temperature, the ionic conductivity of the sample before the ion-exchange process was $5.9 \times 10^{-7}$ S/cm while the ionic conductivity of the sample in relative example 3 after the ion-exchange process was $6.1 \times 10^{-6}$ S/cm.

In the above described Table 4, the mixed raw material composition when manufacturing the sample in relative example 3, the ion-exchange process condition and the ionic conductivity of the sample in relative example 3 measured after the ion-exchange process are illustrated together.

It can be understood from the evaluated results of the ionic conductivity in example 2 and relative example 3 that a good ionic conductivity cannot be obtained just by performing the ion-exchange process on the sample in the amorphous state as relative example 3 (the ionic conductivity at room temperature was $6.1 \times 10^{-6}$ S/cm). On the other hand, a high ionic conductivity could be obtained for the sample in example 2 (the ionic conductivity at room temperature was $3.6 \times 10^{-5}$ S/cm). Thus, it was revealed that the ionic conductivity of the sample in example 2 is increased about one digit compared with that of the sample in relative example 3.

Example 3

By a method similar to that of example 2, a sample in example 3 was manufactured and its characteristics were evaluated.

However, in example 3, for the mixed raw material, a chemical composition illustrated in the following Table 5 was used. Other manufacturing conditions were the same as those of example 2.

TABLE 5

| | | EXAMPLE 3 | RELATIVE EXAMPLE 4 |
|---|---|---|---|
| MIXED RAW MATERIAL COMPOSITION (mol %) | $SiO_2$ | 42 | 42 |
| | $ZrO_2$ | 27 | 27 |
| | $P_2O_5$ | 10 | 10 |
| | $Na_2O$ | 21 | 21 |
| HEAT TREATMENT | | 800° C. × 2 HOURS + 1000° C. × 1 HOUR | NO |
| ION-EXCHANGE PROCESS | | 400° C. × 72 HOURS | 400° C. × 72 HOURS |
| IONIC CONDUCTIVITY (S/cm) | | $2.2 \times 10^{-4}$ | $1.4 \times 10^{-5}$ |

A "sample in example 3" was obtained after the ion-exchange process.

Figure 7:
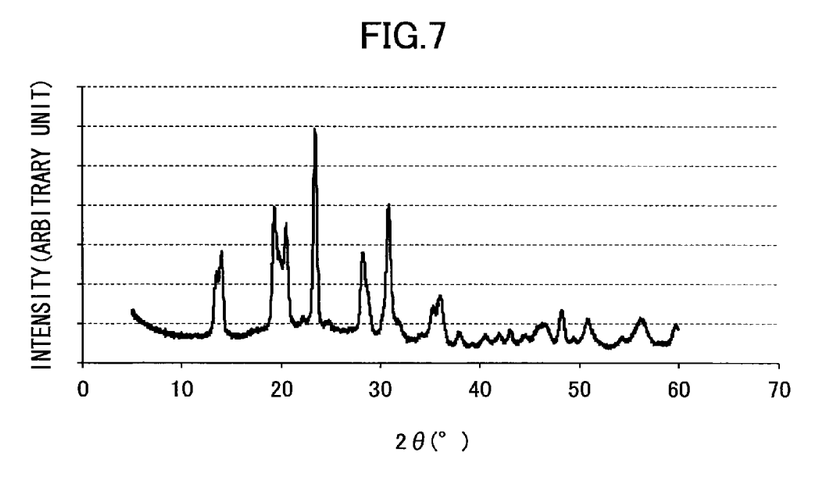
FIG. 7 is a view illustrating an X-ray diffraction result of a sample in example 3 after the ion-exchange process.

FIG. 7 illustrates an X-ray diffraction result of the sample in example 3 after the ion-exchange process. The X-ray diffraction results before and after the ion-exchange process were almost the same. With this result, it was confirmed that the sample in example 3 has a crystal structure similar to that of the sample before the ion-exchange process, in other words, the crystal structure of lithium substituted NASICON type.

Here, when the actual lithium amount contained in the sample in example 3 was analyzed by the ICP analysis method, the contained lithium amount was 7.12 mass %, based on the content of $Li_2O$ (contained sodium amount was 0.02 mass %, based on the content of $Na_2O$). When assuming that sodium in the sample in example 3 before the ion-exchange process is substituted for by lithium by the ion-exchange process for 100%, theoretically, the contained lithium amount becomes 7.15 mass %, based on the content of $Li_2O$. The analysis result of this example is extremely close to the theoretical value, and it was confirmed that almost all of sodium ions in the sample were substituted for by lithium ions by the ion-exchange process.

(Characteristics Evaluation)

An ionic conductivity was measured using the obtained sample in example 3 by the above described method. As a result of evaluation, the ionic conductivity of the sample in example 3 at room temperature was $2.2 \times 10^{-4}$ S/cm. The ionic conductivity of the sample (heat treated sample) before the ion-exchange process at room temperature was $3.4 \times 10^{-6}$ S/cm. Thus, it was revealed that the ionic conductivity of the sample increases more than or equal to one digit by the ion-exchange process.

In the above described Table 5, the mixed raw material composition when manufacturing the sample in example 3, the heat treatment condition for depositing the crystalline material, the ion-exchange process condition and the ionic conductivity of the sample in example 3 measured after the ion-exchange process are illustrated together.

Relative Example 4

By a method similar to that of example 3, a sample in relative example 4 was manufactured and its characteristics were evaluated.

However, the heat treatment for depositing the crystalline material was not performed in relative example 4. This means that the amorphous sample was used as it was and the ion-exchange process was performed. Other manufacturing conditions and the evaluating conditions were the same as those of example 3.

Figure 8:
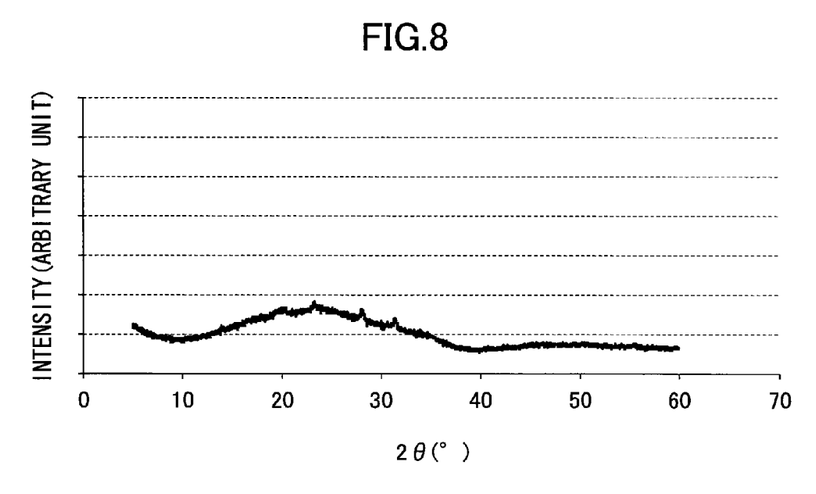
FIG. 8 is a view illustrating an X-ray diffraction result of a sample in relative example 4 after the ion-exchange process.

FIG. 8 illustrates an X-ray diffraction result of the sample in relative example 4 after the ion-exchange process. In FIG. 8, as diffraction peaks are not recognized, it can be understood that the sample in relative example 4 is in the amorphous state even after the ion-exchange process.

As a result of the impedance measurement, at room temperature, the ionic conductivity of the sample before the ion-exchange process was $1.0 \times 10^{-6}$ S/cm while the ionic conductivity of the sample in relative example 4 after the ion-exchange process was $1.4 \times 10^{-5}$ S/cm.

In the above described Table 5, the mixed raw material composition when manufacturing the sample in relative example 4, the ion-exchange process condition and the ionic conductivity of the sample in relative example 4 measured after the ion-exchange process are illustrated together.

It can be understood from the evaluated results of the ionic conductivity in example 3 and relative example 4 that a good ionic conductivity cannot be obtained just by performing the ion-exchange process on the sample in the amorphous state as relative example 4 (the ionic conductivity at room temperature was $1.4 \times 10^{-5}$ S/cm). On the other hand, a high ionic conductivity could be obtained for the sample in example 3 (the ionic conductivity at room temperature was $2.2 \times 10^{-4}$ S/cm). Thus, it was revealed that the ionic conductivity of the sample in example 3 is increased about one digit compared with that of the sample in relative example 4.

Example 4

By a method similar to that of example 2, a sample in example 4 was manufactured and its characteristics were evaluated.

However, in example 4, for the mixed raw material, a chemical composition illustrated in Table 6 was used. Other manufacturing conditions were the same as those of example 2.

TABLE 6

| | | EXAMPLE 4 | RELATIVE EXAMPLE 5 |
|---|---|---|---|
| MIXED RAW MATERIAL COMPOSITION (mol %) | $SiO_2$ | 35 | 35 |
| | $ZrO_2$ | 30 | 30 |
| | $P_2O_5$ | 15 | 15 |
| | $Na_2O$ | 20 | 20 |
| HEAT TREATMENT | | 800° C. × 2 HOURS + 1000° C. × 1 HOUR | NO |
| ION-EXCHANGE PROCESS | | 400° C. × 72 HOURS | 400° C. × 72 HOURS |
| IONIC CONDUCTIVITY (S/cm) | | $3.5 \times 10^{-4}$ | $1.2 \times 10^{-5}$ |

A "sample in example 4" was obtained after the ion-exchange process.

Figure 9:
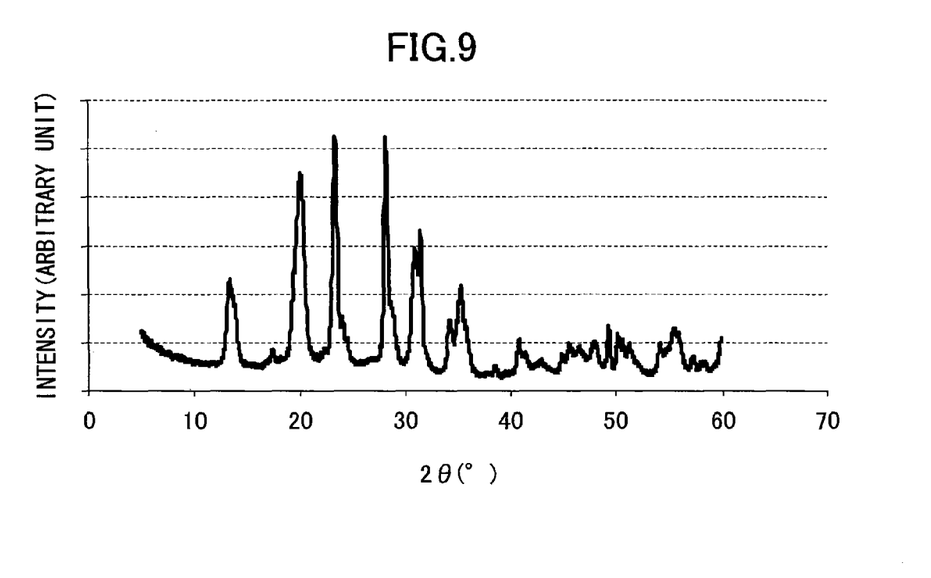
FIG. 9 is a view illustrating an X-ray diffraction result of a sample in example 4 after the ion-exchange process.

FIG. 9 illustrates an X-ray diffraction result of the sample in example 4 after the ion-exchange process. The X-ray diffraction results before and after the ion-exchange process were almost the same. With this result, it was confirmed that the sample in example 4 has a crystal structure similar to that of the sample before the ion-exchange process, in other words, the crystal structure of lithium substituted NASICON type.

Here, when the actual lithium amount contained in the sample in example 4 was analyzed by the ICP analysis method, the contained lithium amount was 6.99 mass %, based on the content of $Li_2O$ (contained sodium amount was 0.03 mass %, based on the content of $Na_2O$). When assuming that sodium in the sample in example 4 before the ion-exchange process is substituted for by lithium by the ion-exchange process for 100%, theoretically, the contained lithium amount becomes 7.01 mass %, based on the content of $Li_2O$. The analysis result of this example is extremely close to the theoretical value, and it was confirmed that almost all of sodium ions in the sample were substituted for by lithium ions by the ion-exchange process.

(Characteristics Evaluation)

An ionic conductivity was measured using the obtained sample in example 4 by the above described method. As a result of evaluation, the ionic conductivity of the sample in example 4 at room temperature was $3.5 \times 10^{-4}$ S/cm. The ionic conductivity of the sample (heat treated sample) before the ion-exchange process at room temperature was $2.0 \times 10^{-7}$ S/cm. Thus, it was revealed that the ionic conductivity of the sample increases more than or equal to one digit by the ion-exchange process.

In Table 6, the mixed raw material composition when manufacturing the sample in example 4, the heat treatment condition for depositing the crystalline material, the ion-exchange process condition and the ionic conductivity of the sample in example 4 measured after the ion-exchange process are illustrated together.

Relative Example 5

By a method similar to that of example 4, a sample in relative example 5 was manufactured and its characteristics were evaluated.

However, the heat treatment for depositing crystalline materials was not performed in relative example 5. This means that the amorphous sample was used as it was and the ion-exchange process was performed. Other manufacturing conditions and evaluating conditions were the same as those of example 4.

Figure 10:
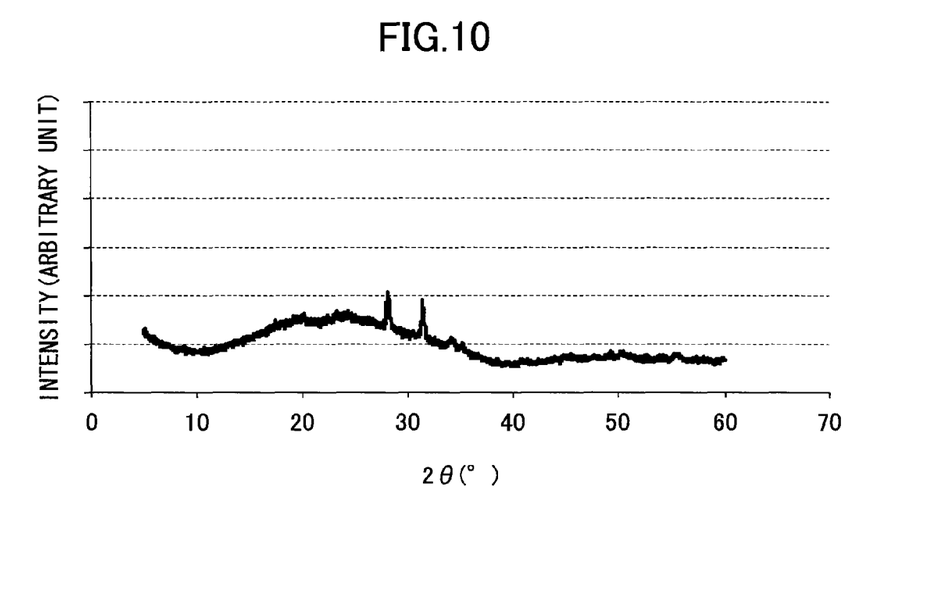
FIG. 10 is a view illustrating an X-ray diffraction result of a sample in relative example 5 after the ion-exchange process.

FIG. 10 illustrates an X-ray diffraction result of the sample in relative example 5 after the ion-exchange process. In FIG. 10, as diffraction peaks are not recognized, it can be understood that the sample in relative example 5 is in the amorphous state even after the ion-exchange process.

As a result of the impedance measurement, at room temperature, the ionic conductivity of the sample in relative example 5 was $1.2 \times 10^{-5}$ S/cm.

As a result of the impedance measurement, at room temperature, the ionic conductivity of the sample before the ion-exchange process was $6.2 \times 10^{-7}$ S/cm while the ionic conductivity of the sample after the ion-exchange process was $1.2 \times 10^{-5}$ S/cm in relative example 5.

In the above described Table 6, the mixed raw material composition when manufacturing the sample in relative example 5, the ion-exchange process condition and the ionic conductivity of the sample in relative example 5 measured after the ion-exchange process are illustrated together.

It can be understood from the evaluated results of the ionic conductivity in example 4 and relative example 5 that a good ionic conductivity cannot be obtained just by performing the ion-exchange process on the sample in the amorphous state as relative example 5 (the ionic conductivity at room temperature was $1.2 \times 10^{-5}$ S/cm). On the other hand, a high ionic conductivity could be obtained for the sample in example 4 (the ionic conductivity at room temperature was $3.5 \times 10^{-4}$ S/cm). Thus, it was revealed that the ionic conductivity of the sample in example 4 is increased about one digit compared with that of the sample in relative example 5.

As such, it was confirmed that the ionic conductivity of the sample in example 4 manufactured by the method of the embodiment is significantly improved.

Example 5

By a method similar to that of example 2, a sample in example 5 was manufactured and its characteristics were evaluated.

Here, in example 5, a mixed raw material including 42.5 mol % of $SiO_2$, 22.5 mol % of $ZrO_2$, 15 mol % of $P_2O_5$ and 20 mol % of $Na_2O$ was used as the mixed raw material. Other manufacturing conditions were the same as those of example 2.

When manufacturing the sample of this example, it was confirmed that a crystalline material was partially deposited in the glass when solidifying the material after the material was dissolved.

A "sample in example 5" was obtained after the ion-exchange process.

The X-ray diffraction results of the sample in example 5 was almost the same as that before the ion-exchange process were. With this result, it was confirmed that the sample in example 5 has a crystal structure similar to that of the sample before the ion-exchange process, in other words, the crystal structure of lithium substituted NASICON type.

Here, when the actual lithium amount contained in the sample in example 5 was analyzed by the ICP analysis method, the contained lithium amount was 7.41 mass %, based on the content of $Li_2O$ (contained sodium amount was 0.03 mass %, based on the content of $Na_2O$). When assuming that sodium in the sample in example 5 before the ion-exchange process is substituted for by lithium by the ion-exchange process for 100%, theoretically, the contained lithium amount becomes 7.47 mass %, based on the content of $Li_2O$. The analysis result of this example is extremely close to the theoretical value, and it was confirmed that almost all of sodium ions in the sample were substituted for by lithium ions by the ion-exchange process.

(Characteristics Evaluation)

An ionic conductivity was measured using the obtained sample in example 5 by the above described method. As a result of evaluation, the ionic conductivity of the sample in example 5 at room temperature was $7.1 \times 10^{-4}$ S/cm. The ionic conductivity of the sample (heat treated sample) before the ion-exchange process at room temperature was $1.8 \times 10^{-7}$ S/cm. It was revealed that the ionic conductivity of the sample increases more than or equal to one digit by the ion-exchange process.

As such, it was confirmed that the ionic conductivity of the sample in example 5 manufactured by the method of the embodiment is significantly improved.

According to the present invention, a method of manufacturing a lithium ion conductive solid electrolyte is provided, by which a further greater ion conductivity improving effect can be obtained compared with the conventional method in which glass is performed with an ion-exchange process. Further, according to the present invention, a lithium-ion secondary battery including such a lithium ion conductive solid electrolyte is provided.

What is claimed is:

1. A method of manufacturing a lithium ion conductive solid electrolyte, comprising:
   (a) preparing an object comprising a crystalline material by heating a raw material to be dissolved, solidifying the heated raw material containing a alkali metal other than lithium to form an amorphous material, and performing a heat treatment on the solidified amorphous material, wherein the crystalline material comprises the at least one alkali metal other than lithium and an ionic conductivity at room temperature of the crystalline material is greater than or equal to $1 \times 10^{-13}$ S/cm; and
   (b) performing an ion-exchange of the at least one metal other than lithium with lithium on the object in a molten salt comprising lithium ions;
   wherein the crystalline material has at least one crystal structure selected from a group consisting of a mica crystal structure, a NASICON crystal structure, a β iron (III) sulfate crystal structure, a Perovskite crystal structure, a CaS(NaCl) crystal structure, a β" alumina crystal structure, a montmorillonite substituted crystal structure, a hollandite crystal structure and a zircon crystal structure.

2. The method of manufacturing a lithium ion conductive solid electrolyte according to claim 1, wherein the crystalline material has a crystal structure of a mica crystal structure or a NASICON crystal structure.

3. The method of manufacturing a lithium ion conductive solid electrolyte according to claim 1, wherein the ion-exchange process is performed by retaining the object to be processed in the molten salt including lithium ions at a temperature of 200° C. to 400° C. for 24 hours to 120 hours.

4. The method of manufacturing a lithium ion conductive solid electrolyte according to claim 1, wherein the ionic conductivity-of the object to be processed increases more than or equal to one digit before and after the step (b).

5. The method of manufacturing a lithium ion conductive solid electrolyte according to claim 1, wherein at least a part of the amorphous material is changed to a crystalline material during the heat treatment.

6. The method of manufacturing a lithium ion conductive solid electrolyte according to claim 1, wherein the preparing comprises two heat treatments.

7. The method of manufacturing a lithium ion conductive solid electrolyte according to claim 1, further comprising:
   (c) adjusting the thickness of the object to less than or equal to 1.0 mm, before the ion exchange (b).

* * * * *